United States Patent
Hibbs et al.

(10) Patent No.: US 10,666,098 B2
(45) Date of Patent: *May 26, 2020

(54) FLUX CONCENTRATOR FOR IRONLESS MOTOR

(71) Applicant: AeroVironment, Inc., Monrovia, CA (US)

(72) Inventors: Bart Dean Hibbs, Simi Valley, CA (US); Bang Xuan Phan, Rancho Santa Margarita, CA (US)

(73) Assignee: AeroVironment, Inc., Simi Valley, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/909,982

(22) Filed: Mar. 1, 2018

(65) Prior Publication Data

US 2018/0331590 A1 Nov. 15, 2018

Related U.S. Application Data

(60) Continuation of application No. 14/994,130, filed on Jan. 12, 2016, now Pat. No. 9,941,757, which is a
(Continued)

(51) Int. Cl.
H02K 1/27 (2006.01)
H02K 7/18 (2006.01)
(Continued)

(52) U.S. Cl.
CPC ............ *H02K 1/2706* (2013.01); *H02K 1/27* (2013.01); *H02K 1/2786* (2013.01); *H02K 3/02* (2013.01);
(Continued)

(58) Field of Classification Search
CPC ...... Y02E 10/725; H02K 1/2706; H02K 1/27; H02K 1/2786; H02K 3/02; H02K 3/28; H02K 7/1838; H02K 21/12
(Continued)

(56) References Cited

U.S. PATENT DOCUMENTS 5,331,244 A * 7/1994 Rabe .................. H02K 3/04
310/114
5,723,933 A * 3/1998 Grundl ................ H02K 3/04
310/208
(Continued)

FOREIGN PATENT DOCUMENTS

JP 2008037769 2/1996
JP 2007006545 A 1/2007

OTHER PUBLICATIONS

Korean Intellectual Property Office (KIPO): Final Office Action (FOA) for corresponding Korean case application No. 10-2018-7007821 entitled Flux Concentrator for Ironless Motor by Hibbs et al.; dated Apr. 4, 2019 from Korean Intellectual Property Office; 3 pgs.
(Continued)

*Primary Examiner* — Michael Andrews
(74) *Attorney, Agent, or Firm* — Christopher R. Balzan, Esq.; Eric J. Aagaard, Esq.

(57) ABSTRACT

In one embodiment, a magnet array and ironless winding for a motor is provided which has an array of permanent magnets being arranged such that flux from the permanent magnets reinforce on one side of the array and substantially cancel on an opposite side of the array, the array further includes flux concentrators forming poles on the reinforcing side of the array, and such that a magnetic moment at the poles is oriented generally perpendicular to the reinforcing side of the array, the winding being adjacent to the array and comprising conductor bundles having a generally rectangu-
(Continued)

lar cross-section arranged such that a long side of the generally rectangular cross-section is transverse to a direction of magnetic field lines at the poles.

20 Claims, 5 Drawing Sheets

Related U.S. Application Data division of application No. 12/565,718, filed on Sep. 23, 2009, now Pat. No. 9,270,154.

(60) Provisional application No. 61/194,099, filed on Sep. 23, 2008, provisional application No. 61/194,056, filed on Sep. 23, 2008.

(51) Int. Cl.
  *H02K 21/12* (2006.01)
  *H02K 3/02* (2006.01)
  *H02K 3/28* (2006.01)

(52) U.S. Cl.
  CPC ............. *H02K 3/28* (2013.01); *H02K 7/1838* (2013.01); *H02K 21/12* (2013.01); *Y02E 10/725* (2013.01)

(58) Field of Classification Search
  USPC .................................................... 310/156.07
  See application file for complete search history.

(56) References Cited

U.S. PATENT DOCUMENTS

| | | | |
|---|---|---|---|
| 6,169,352 B1 | 1/2001 | Hull | |
| 7,053,508 B2 | 5/2006 | Kusase et al. | |
| 8,446,054 B2 | 5/2013 | Toyota et al. | |
| 8,604,652 B2 | 12/2013 | Sheppard et al. | |
| 8,723,378 B2 | 5/2014 | Daboussi et al. | |
| 9,035,526 B2 | 5/2015 | Rippel et al. | |
| 9,270,154 B2* | 2/2016 | Hibbs | H02K 1/27 |
| 9,941,757 B2* | 4/2018 | Hibbs | H02K 1/2786 |
| 2005/0040721 A1* | 2/2005 | Kusase | H02K 1/278 310/156.43 |
| 2005/0236918 A1 | 10/2005 | Van Den Bergh et al. | |
| 2006/0138879 A1* | 6/2006 | Kusase | B60K 7/0007 310/67 R |
| 2008/0224557 A1 | 9/2008 | Cleveland | |

OTHER PUBLICATIONS

International Searching Authority; International Search Report (ISR) for corresponding PCT case application No. PCT/US2009/058122 entitled Flux concentrator for ironless motor by Hibbs et al.; dated Mar. 29, 2010 from US International Searching Authority; 2 pgs.
International Searching Authority; Written Opinion (WO) of the International Searching Authority and Search History for corresponding PCT case application No. PCT/US2009/058122 entitled Flux concentrator for ironless motor by Hibbs et al.; dated Mar. 29, 2010 from US International Searching Authority; 8 pgs.
Halbach Array, Wikipedia, the free encyclopedia, http://en.wikipedia.org/wiki/Halbach_array, accessed Sep. 21, 2009, 8 pgs.
H.C.Lovatt, et al, Design of an in-wheel motor for a solar-powered electric vehicle, 8th International Conference of Electrical Machines and Drives, EMD97 Sep. 1-3, Conference Publication No. 444, IEEE 1997, pp. 234-238, 5 pgs.
Australian Government IP Australia, (AU) Examiner's First Report (Exam_Report) for corresponding Australia case application No. 2009296688 entitled Flux Concentrator for Ironless Motor by Hibbs et al., Sep. 23, 2009, Australia Government Intellectual Property Australia, dated Aug. 8, 2011, 2 pgs.
European Patent Office (EPO); extended European Search Report (eESR); and Annex to the ESR for corresponding European case application No. EP 09 81 6821 entitled Flux Concentrator for Ironless Motor by Hibbs et al.; dated Dec. 13, 2012 from European Patent Office; 7 pgs.
State Intellectual Property Office (SIPO): First Office Action (1OA) and Search Report (Search_Rpt) for corresponding China case application No. 200980146816.2 entitled Flux Concentrator for Ironless Motor by Hibbs et al.; dated Feb. 6, 2013 from State Intellectual Property Office of the People's Republic of China; 11 pgs.
Hungarian Intellectual Property Office (HIPO) Search Report and Written Opinion (WO); for corresponding Singapore case application No. 201104426-0 entitled Flux Concentrator for Ironless Motor by Hibbs et al.; dated Jun. 13, 2013 from Hungarian Intellectual Property Office; 14 pgs.
Japan Patent Office (JPO) Office Action (OA) corresponding Japanese Patent Application No. 2011-529201 Entitled Flux concentrator for ironless motors by Hibbs et al., dated Jan. 28, 2014 from Japan Patent Office, 2 pgs. Machine Translation.
Hungarian Intellectual Property Office (HIPO) Examination Report (Exam_Rpt); for corresponding Singapore case application No. 201104426-0 entitled Flux Concentrator for Ironless Motor by Hibbs et al.; dated May 15, 2014 from Hungarian Intellectual Property Office; 10 pgs.
Korean Intellectual Property Office (KIPO): First Office Action (1OA) for corresponding Korean case application No. 10-2011-7009284 entitled Flux Concentrator for Ironless Motor by Hibbs et al.; dated Jan. 11, 2016 from Korean Intellectual Property Office; 10 pgs.
Canadian Intellectual Property Office (CIPO) First Office Action (OA1) and Examination Search Report (Search_Rpt) for corresponding Canadian case application No. 2,774,926 entitled Flux concentrator for ironless motor by Hibbs et al.; dated Oct. 4, 2016 from Canadian Intellectual Property Office; 13 pgs.
Korean Intellectual Property Office (KIPO): Final Office Action (FOA) for corresponding Korean case application No. 10-2011-7009284 entitled Flux Concentrator for Ironless Motor by Hibbs et al.; dated Oct. 27, 2016 from Korean Intellectual Property Office; 6 pgs.
Korean Intellectual Property Office (KIPO): Notice of Final Rejection (FOA2) for corresponding Korean case application No. 10-2011-7009284 entitled Flux Concentrator for Ironless Motor by Hibbs et al.; dated Feb. 9, 2017 from Korean Intellectual Property Office; 4 pgs.
Korean Intellectual Property Office (KIPO): First Office Action (1OA) for corresponding Korean case application No. 10-2017-7012793 entitled Flux Concentrator for Ironless Motor by Hibbs et al.; dated Jul. 11, 2017 from Korean Intellectual Property Office; 5 pgs.
Intellectual Property India (IPI): First Examination Report (FER) for corresponding Indian case application No. 1662/KOLNP/2011 entitled Flux Concentrator for Ironless Motor by Hibbs et al.; dated Dec. 14, 2017 from Intellectual Property India, 9 pgs.
Korean Intellectual Property Office (KIPO): First Office Action (1OA) for corresponding Korean divisional case application No. 10-2018-7007821 entitled Flux Concentrator for Ironless Motor by Hibbs et al.; dated Jun. 11, 2018 from Korean Intellectual Property Office; 15 pgs.

* cited by examiner

FLUX CONCENTRATOR FOR IRONLESS MOTOR

CROSS REFERENCE TO RELATED APPLICATIONS

The present application is a continuation of U.S. patent application Ser. No. 14/994,130, filed Jan. 12, 2016, by Hibbs et al., entitled FLUX CONCENTRATOR FOR IRONLESS MOTORS, herein incorporated by reference in its entirety, which is a divisional of U.S. patent application Ser. No. 12/565,718, filed Sep. 23, 2009, by Hibbs et al., entitled FLUX CONCENTRATOR FOR IRONLESS MOTORS, herein incorporated by reference in its entirety, which claims the benefit of the following applications which are all herein incorporated by reference in their entireties:

U.S. Provisional Application No. 61/194,056, filed Sep. 23, 2008, by Bart Dean Hibbs, entitled FLUX CONCENTRATOR FOR IRONLESS MOTORS; and U.S. Provisional Application No. 61/194,099, filed Sep. 23, 2008, by Daboussi et al., entitled PROPELLER DRIVE UNIT FOR HALE UAV.

The present application is also related to the following applications, which are hereby incorporated by reference in their entireties:

U.S. Non-provisional application Ser. No. 12/565,705, filed Sep. 23, 2009, entitled COMPRESSED MOTOR WINDING, by Rippel et al., U.S. Pat. No. 9,035,526, Issued May 19, 2015;

U.S. Non-provisional application Ser. No. 12/565,715, filed Sep. 23, 2009, entitled MOTOR AIR FLOW COOLING, by Sheppard et al., U.S. Pat. No. 8,604,652, Issued Dec. 10, 2013; and U.S. Non-provisional application Ser. No. 12/565,710, filed Sep. 23, 2009, entitled STATOR WINDING HEAT SINK CONFIGURATION, by Daboussi et al., U.S. Pat. No. 8,723,378, Issued May 13, 2014.

BACKGROUND

Electric motors for vehicles need to have high efficiency to conserve power. Furthermore, in unmanned or manned vehicles, light weight and compact electric motors are also desirable. Thus, ironless motors are often used which can provide the benefit of no iron losses due to changing flux direction. Ironless motors, however, suffer from poor field strength in the gap.

Motors are normally rated for the peak power and efficiency of the motor. In some applications, high part load efficiency is desired, which is high efficiency when machine is loaded at a partial load, i.e. 15% or some other percent.

What is needed is a higher efficiency compact motor.

SUMMARY

In one possible embodiment, a magnet array and ironless winding for a motor is provided which has an array of permanent magnets being arranged such that flux from the permanent magnets reinforce on one side of the array and substantially cancel on an opposite side of the array, the array further includes flux concentrators forming at poles on the reinforcing side of the array and such that a magnetic moment at the poles is oriented generally perpendicular to the reinforcing side of the array, the ironless winding being adjacent to the array and comprising conductor bundles having a generally rectangular cross-section arranged such that a long side of the generally rectangular cross-section is transverse to a direction of magnetic field lines at the poles.

In another embodiment, a motor is provided including a stator and a rotor, the rotor having an array of permanent magnets being arranged such that flux from the permanent magnets reinforce on a side of the array facing the stator and substantially cancel on a side of the array opposite the stator, the array further having flux concentrators forming poles on the reinforcing side of the array, such that a magnetic moment at the poles is oriented generally perpendicular to the reinforcing side of the array. The stator has an ironless winding adjacent to the array with conductor bundles having a generally rectangular cross-section arranged such that a long side of the generally rectangular cross-section is transverse to a direction of magnetic field lines at the poles In another embodiment, a motor is provided including an inner rotor and an outer rotor with an ironless stator winding therebetween. The inner rotor and the outer rotor each have flux concentrators and permanent magnets and each have an array of permanent magnets being arranged such that flux from the permanent magnets reinforce on a side of the array facing the stator and substantially cancel on a side of the array opposite the stator, each array further has flux concentrators located at poles on the reinforcing side of the array such that the poles within the array have a magnetic moment oriented generally perpendicular to the stator side of the array. This embodiment may further include a stator having an ironless winding between the inner rotor and the outer rotor, the ironless winding being adjacent to the array and having conductor bundles having a generally rectangular cross-section arranged such that a long side of the generally rectangular cross-section is transverse to a direction of magnetic field lines between the poles.

In another possible embodiment, a motor is provided including an inner rotor and an outer rotor with an ironless stator winding therebetween, the inner and outer rotors each comprise flux concentrators and permanent magnets, the permanent magnets each comprise a pole surface, the pole surfaces of a plurality of permanent magnets face an adjacent flux concentrator, the flux concentrators of the inner and outer rotors are located so as to mutually reinforce flux across the winding.

In another possible embodiment, a magnet array is provided for a motor having an array of permanent magnets arranged such that flux from the permanent magnets reinforce on one side of the array and substantially cancel on an opposite side of the array. In this embodiment, the magnets are arranged such that the magnetic moments of adjacent magnets are oriented in directions separated by about 45 degrees, and such that a magnet within the array comprises a magnetic moment oriented generally perpendicular to the reinforcing side of the array.

The embodiments may be combined and other embodiments are possible.

BRIEF DESCRIPTION OF THE DRAWINGS

The features and advantages of the present invention will be better understood with regard to the following description, appended claims, and accompanying drawings where:

DESCRIPTION

Figure 1:
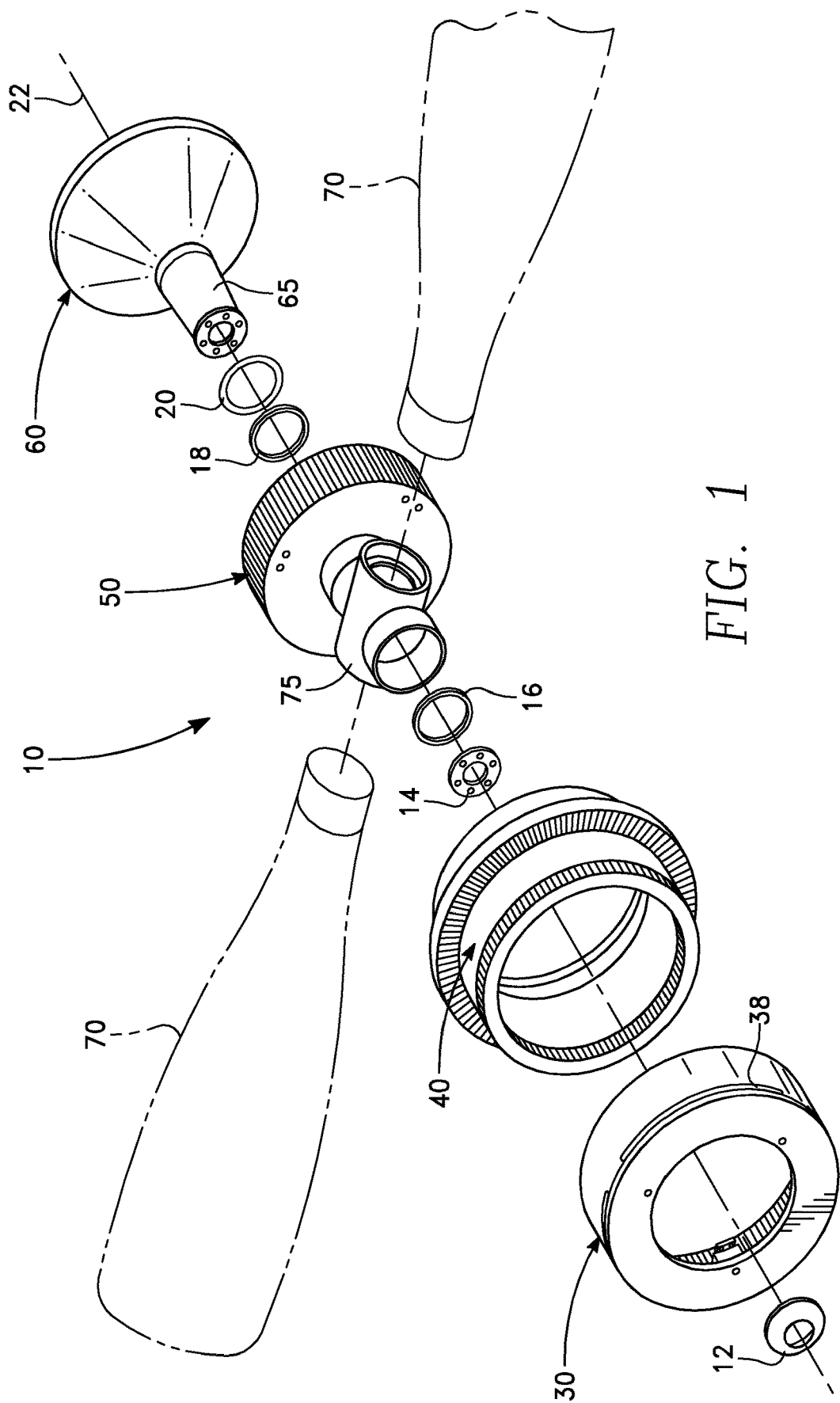
FIG. 1 shows a simplified exploded perspective view of an example motor.

FIG. 1 shows a simplified exploded perspective view of an example motor 10 along axis 22. A stator 40 is secured to a housing 60. Inner rotor 50 and outer rotor 30 are secured to each other and surround the stator 40. An optional propeller hub 75, into which propeller blades 70 are mounted, is secured to the inner rotor 50. The propeller hub 75 rotatably mounts on the spindle 65 with bearings 16 and 18. The bearings 16 and 18 are retained by retainers 20 and 14 and cover 12.

Figure 2:
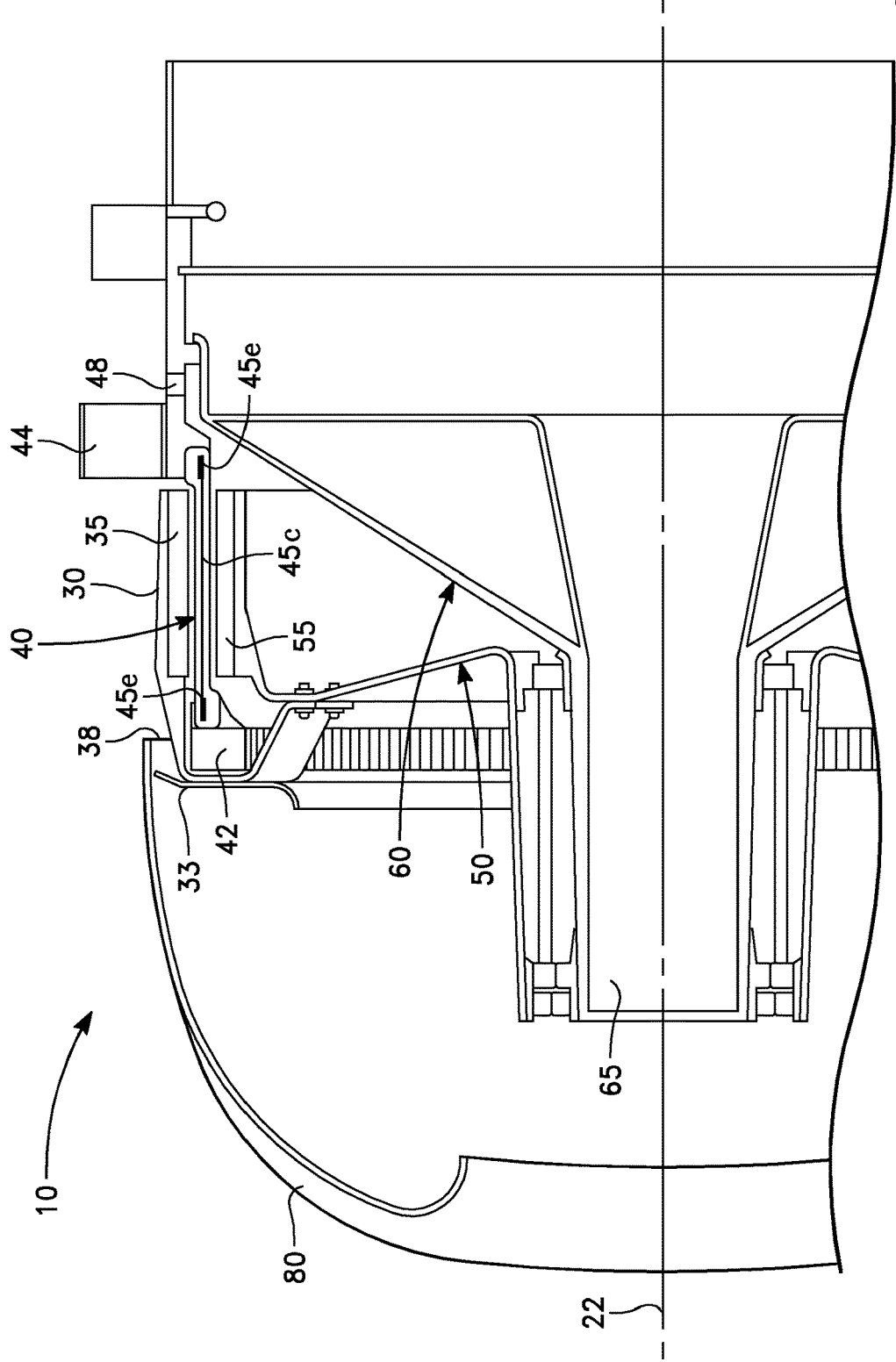
FIG. 2 shows a simplified cross sectional side view of the motor of FIG. 1 along its longitudinal axis.

FIG. 2 shows a simplified cross-sectional side view of the motor 10 of FIG. 1 along its longitudinal axis 22. The stator 40 is located between magnets 35 and 55 of the inner and outer rotors 50 and 30, respectively. The propeller hub 75 is bonded to the inner rotor 50 which is rotatably mounted on the spindle 65. The spindle 65 may be fabricated of carbon fiber or other suitable material.

Figure 3:
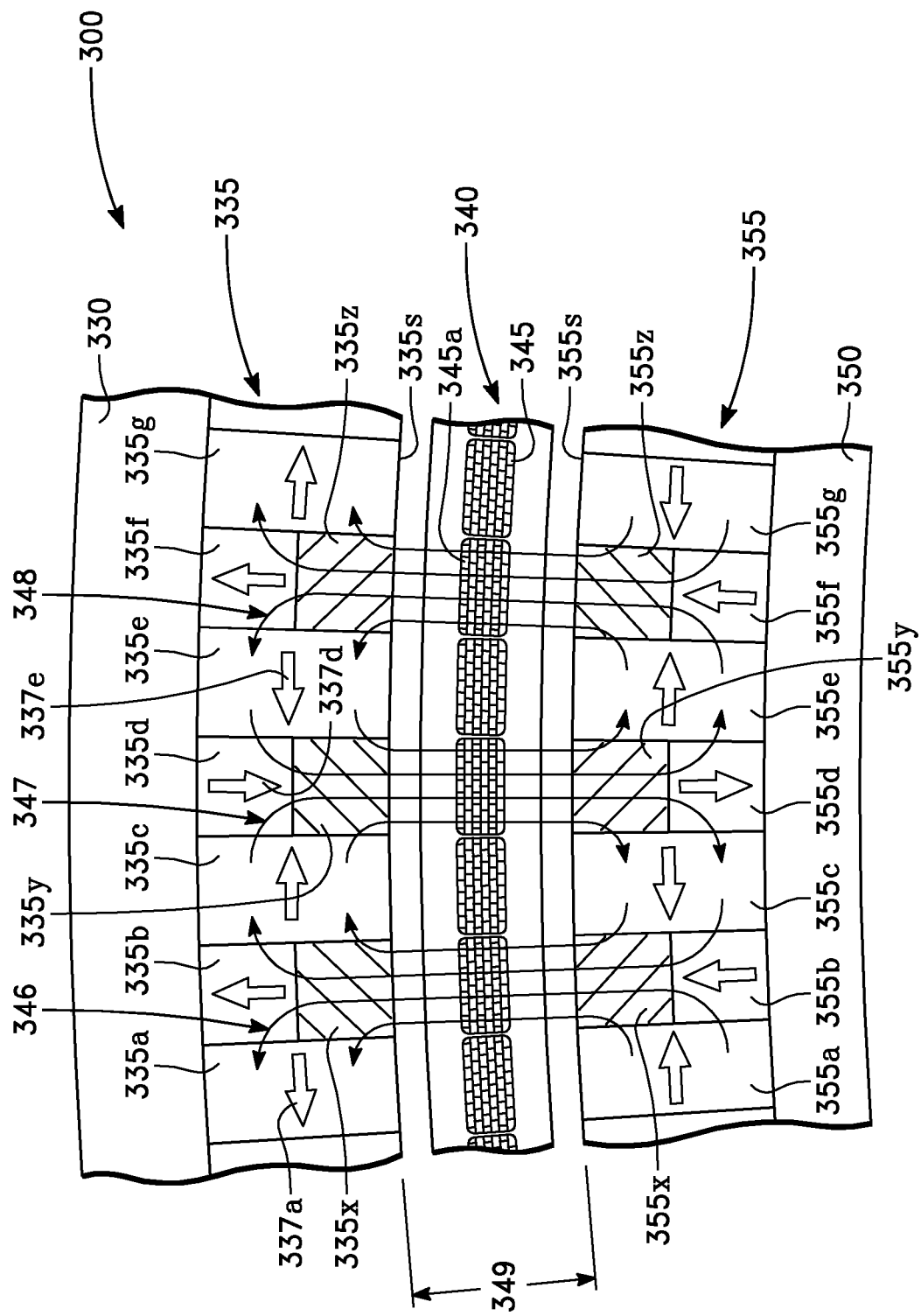
FIG. 3 shows a simplified cut away front view of a portion of a possible embodiment of a permanent magnet motor.

FIG. 3 shows a simplified cut away front view of a portion 300 of a possible embodiment of a permanent magnet motor. In FIG. 3, a stator 340 having a winding 345 is located between inner and outer magnet assemblies 355 and 335 of inner and outer rotors 350 and 330.

The inner and outer magnet assemblies 355 and 335 have magnets 355a-g and 335a-g arranged with the permanent magnetic fields oriented as indicated by arrows within the magnets 355a-g and 335a-g. The magnetic orientations 357a-g of magnets 355a-g, or the magnetic orientations 337a-g of magnets 335a-g, are similar to those in a Halbach array. In a Halbach array, permanent magnets are arranged such that flux from the permanent magnets reinforce on one side of the array and substantially cancel on an opposite side of the array. Distinguished from a Halbach array, however, various embodiments have flux concentrators 335x-z and 355x-z, provided in the inner and outer magnet assemblies 355 and 335.

The flux concentrators 335x-z and 355x-z increase the flux density B onto the area of the winding 345. The force and therefore the torque resulting from the flux density B is calculated from this formula F=BxIxL, where I is the current in the wire and L is the length of the wire in the B field. Thus, increasing the B field density on each Litz wire 345a, increases the force F on the in the wire 340a. Increasing the flux concentration on the same wire, at the same length and current, results in higher force on the wire 340a to improve efficiency. Without the flux concentrators 335x-z and 355x-z fringing can occur which reduces the flux density in the wire 345a.

Figure 5A:
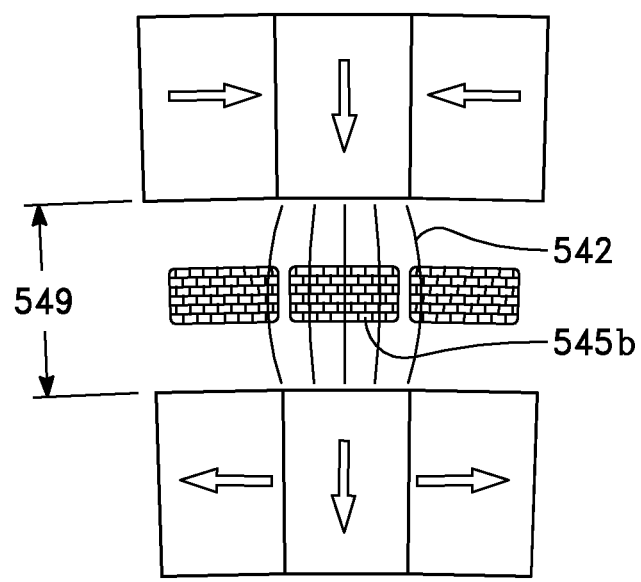
FIGS. 5A & B are a simplified cut away front views illustrating a B field in a permanent magnet motor without and with flux concentrators, respectively.
Figure 5B:
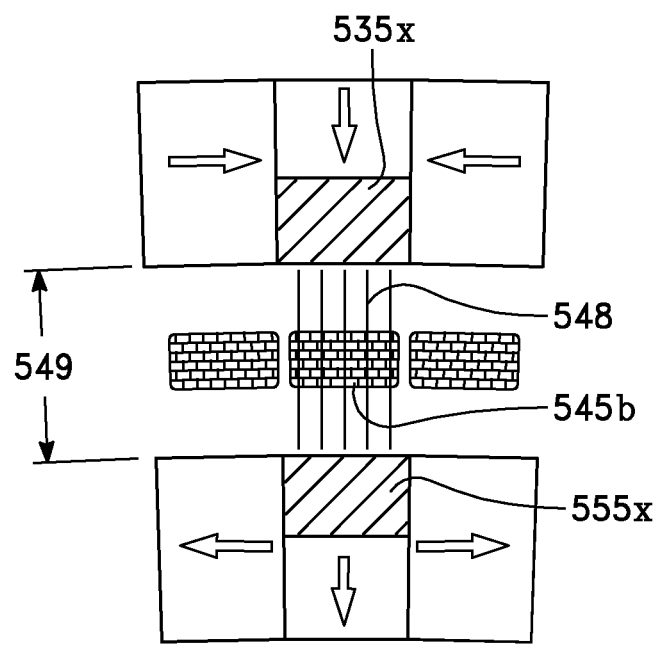

FIG. 5A is a simplified cut away front view illustrating how the B field 542 in the gap 545b fringes without the flux concentrators, resulting in less flux density in the conductor 545b. With flux concentrators 535x and 555x as shown in FIG. 5B, however, the B field 548 has higher density in the wire 545b.

Referring to FIG. 3, the flux concentrators 355x-z and 335x-z are located within the inner and outer magnet assemblies 355 and 335 in opposing positions across the gap 349. They are located in positions where the magnetic fields 346, 347, and 348 reinforce, and in positions where the magnetic fields 346, 347, and 348 cancel, on opposing surfaces 335s and 355s of the gap 349. The flux concentrators 355x-z are located between the gap 349 and respective back magnets 355b, 355d, and 355f. Similarly, the flux concentrators 335x-z are located between the gap 349 and respective back magnets 355b, 355d, and 355f.

The flux concentrators 355x-z and 335x-z may be made of iron, or other magnetic material. The iron material form poles that collect and concentrate the flux from the magnets. Field strength is limited in readily available permanent magnets to about 1 tesla. Iron on the other hand, can support 2 teslas. By using poles along with magnets to force flux across the gap 349, a greater fields 346, 347, and 348, in the gap 349 may be possible. Motor torque is proportional to the field, so as at a fixed torque, doubling the field cuts the I²R losses by ¼.

As used herein, ironless motor means no iron in the winding. The flux concentrators are not limited to iron and may be made of other magnetic materials and high magnetic moment materials.

Although shown as one half the thickness of the corresponding back magnets 335b, 335d, and 335f, the flux concentrators 335x, 335y, and 335z may be larger, or smaller than the back magnet, depending on the materials used and the strength of the magnets. Furthermore, the respective widths of the between magnets 335a, 335c, 335d, and 335g, and the flux concentrator and/or the back magnets 335b, 335d, 335f, may be different and need not be equal.

The spacing and orientations/periodicity of the magnets with respect to the number and spacing of windings in the rotor should be matched, so that the fields in the gap generate additive currents in the stator windings.

Figure 4:
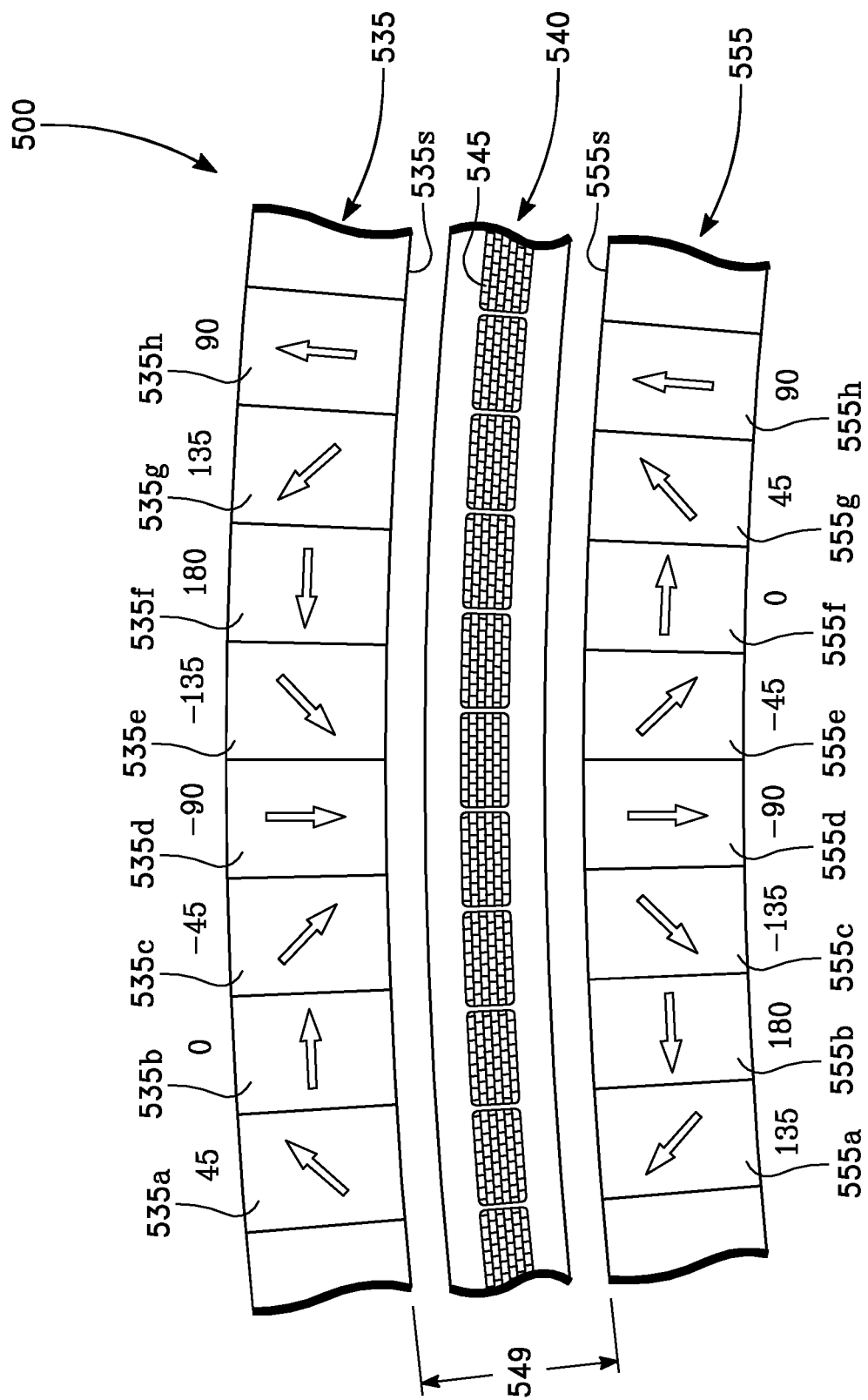
FIG. 4 shows a simplified cut away front view of a portion of a possible another embodiment of a permanent magnet motor.

FIG. 4 shows a simplified cut away front view of a portion 500 of a possible another embodiment of a permanent magnet motor. In this embodiment, the orientation of the magnetic moments of successive permanent magnets in the outer rotor array 535 are each rotated 45 degrees or π/4 radians, with respect to an adjacent magnet. Similarly, the orientation of the magnetic moments of successive permanent magnets in the inner rotor array 355 are each rotated 45 degrees with respect to an adjacent magnet. The outer magnets 535 are oriented such that they reinforce at −90 degrees at magnet 535d and cancel at 90 degrees at magnet 535h at the gap surface 535s in the outer array 535, and the inner magnets 555 are oriented such that they reinforce at 90 degrees at magnet 555h and cancel at −90 degrees at magnet 555d at the gap surface 555s.

An advantage of orienting the magnets with 45 degrees of separation, and including 90 degree orientation with respect to the stator winding 545, as shown in FIG. 4, is that it provides a higher back EMF than a 60, 30, −30, −60 degree orientations. In some embodiments the embodiment of FIG. 4 provided about a 10% higher back EMF than a 60, 30, −30, −60 degree orientations.

Embodiments and implementation of the present invention are not limited to the motor embodiments shown in FIGS. 3 and 4. The magnet arrays described herein may be applied to various axial or radial motors, or to other Halbach array/cylinder/sphere devices, or the like, including wigglers, and are not limited to use in dual rotor motors. As used herein, array is intended to cover cylinders, spheres, or the like, utilizing the array structure. Furthermore, embodiments and implementations are not limited to aircraft motors, but may also be employed in automobiles, machinery, instruments, space, or other applications.

It is worthy to note that any reference to "one embodiment" or "an embodiment" means that a particular feature, structure, or characteristic described in connection with the embodiment may be included in an embodiment, if desired. The appearances of the phrase "in one embodiment" in various places in the specification are not necessarily all referring to the same embodiment.

The illustrations and examples provided herein are for explanatory purposes and are not intended to limit the scope of the appended claims. This disclosure is to be considered an exemplification of the principles of the invention and is not intended to limit the spirit and scope of the invention and/or claims of the embodiment illustrated.

Those skilled in the art will make modifications to the invention for particular applications of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

Having described this invention in connection with a number of embodiments, modification will now certainly suggest itself to those skilled in the art. The example embodiments herein are not intended to be limiting, various configurations and combinations of features are possible. As such, the invention is not limited to the disclosed embodiments, except as required by the appended claims.

What is claimed is:

1. A magnet array and ironless winding for a motor comprising:
   a) an array of permanent magnets being arranged such that flux from the permanent magnets reinforce on one side of the array and substantially cancel on an opposite side of the array, the array further comprising flux concentrators forming poles on the reinforcing side of the array and such that a magnetic moment at the poles is oriented generally perpendicular to the reinforcing side of the array; and
   b) an ironless winding adjacent to the array comprising conductor bundles having a generally rectangular cross-section arranged such that a long side of the generally rectangular cross-section is transverse to a direction of magnetic field lines at the poles.

2. The magnet array and ironless winding of claim 1, wherein the flux concentrators are recessed into the array.

3. The magnet array and ironless winding of claim 2, wherein an exterior surface of the flux concentrators are aligned with exterior surfaces of adjacent magnets located along the reinforcing side.

4. The magnet array and ironless winding of claim 1, wherein the flux concentrators comprise a magnetic material having a higher flux density than the magnets.

5. The magnet array and ironless winding of claim 1, wherein the array comprises back magnets behind the flux concentrators on a side opposite the reinforcing side of the array.

6. The magnet array and ironless winding of claim 1, wherein the flux concentrators are placed into the array such that each flux concentrator has a back magnet and is located between adjacent side magnets.

7. The magnet array and ironless winding of claim 6, wherein magnetic moments of magnets adjacent to a flux concentrator either all point in a direction generally toward the adjacent flux concentrator or all point in a direction generally away from the adjacent flux concentrator.

8. The magnet array and ironless winding of claim 6, wherein the flux concentrators comprise a magnetic material having a higher flux density than the magnets.

9. The magnet array and ironless winding of claim 8, wherein the flux concentrators comprise iron.

10. The magnet array and ironless winding of claim 1, wherein the flux concentrators comprise iron.

11. A motor comprising:
    a) a stator;
    b) a rotor comprising an array of permanent magnets being arranged such that flux from the permanent magnets reinforce on a side of the array facing the stator and substantially cancel on a side of the array opposite the stator, the array further comprising flux concentrators forming poles on the reinforcing side of the array, such that a magnetic moment at the poles is oriented generally perpendicular to the reinforcing side of the array; and
    c) the stator comprising an ironless winding adjacent to the array comprising conductor bundles having a generally rectangular cross-section arranged such that a long side of the generally rectangular cross-section is transverse to a direction of magnetic field lines at the poles.

12. The motor of claim 11, wherein the flux concentrators are recessed into the array.

13. The motor of claim 12, wherein an exterior surface of the flux concentrators are aligned with exterior surfaces of adjacent magnets located along the reinforcing side.

14. The motor of claim 11, wherein the flux concentrators comprise a magnetic material having a higher flux density than the magnets.

15. The motor of claim 11, wherein the array comprises back magnets behind the flux concentrators on a side opposite the reinforcing side of the array.

16. The motor of claim 11, wherein the flux concentrators are placed into the array such that each flux concentrator has a back magnet and is located between adjacent side magnets.

17. The motor of claim 16, wherein magnetic moments of magnets adjacent to a flux concentrator either all point in a direction generally toward the adjacent flux concentrator or all point in a direction generally away from the adjacent flux concentrator.

18. The motor of claim 16, wherein the flux concentrators comprise a magnetic material having a higher flux density than the magnets.

19. The motor of claim 11, wherein the flux concentrators comprise iron.

20. A motor comprising:
   a) an inner rotor and an outer rotor with an ironless stator winding therebetween;
   b) the inner rotor and the outer rotor each comprise flux concentrators and permanent magnets, the inner and outer rotor each comprising an array of permanent magnets being arranged such that flux from the permanent magnets reinforce on a side of the array facing the stator and substantially cancel on a side of the array opposite the stator, each array further comprising flux concentrators located at poles on the reinforcing side of the array such that the poles within the array comprises a magnetic moment oriented generally perpendicular to the stator side of the array; and
   c) a stator comprising an ironless winding between the inner rotor and the outer rotor, the ironless winding being adjacent to the array and comprising conductor bundles having a generally rectangular cross-section arranged such that a long side of the generally rectangular cross-section is transverse to a direction of magnetic field lines between the poles.

\* \* \* \* \*